2,304,417

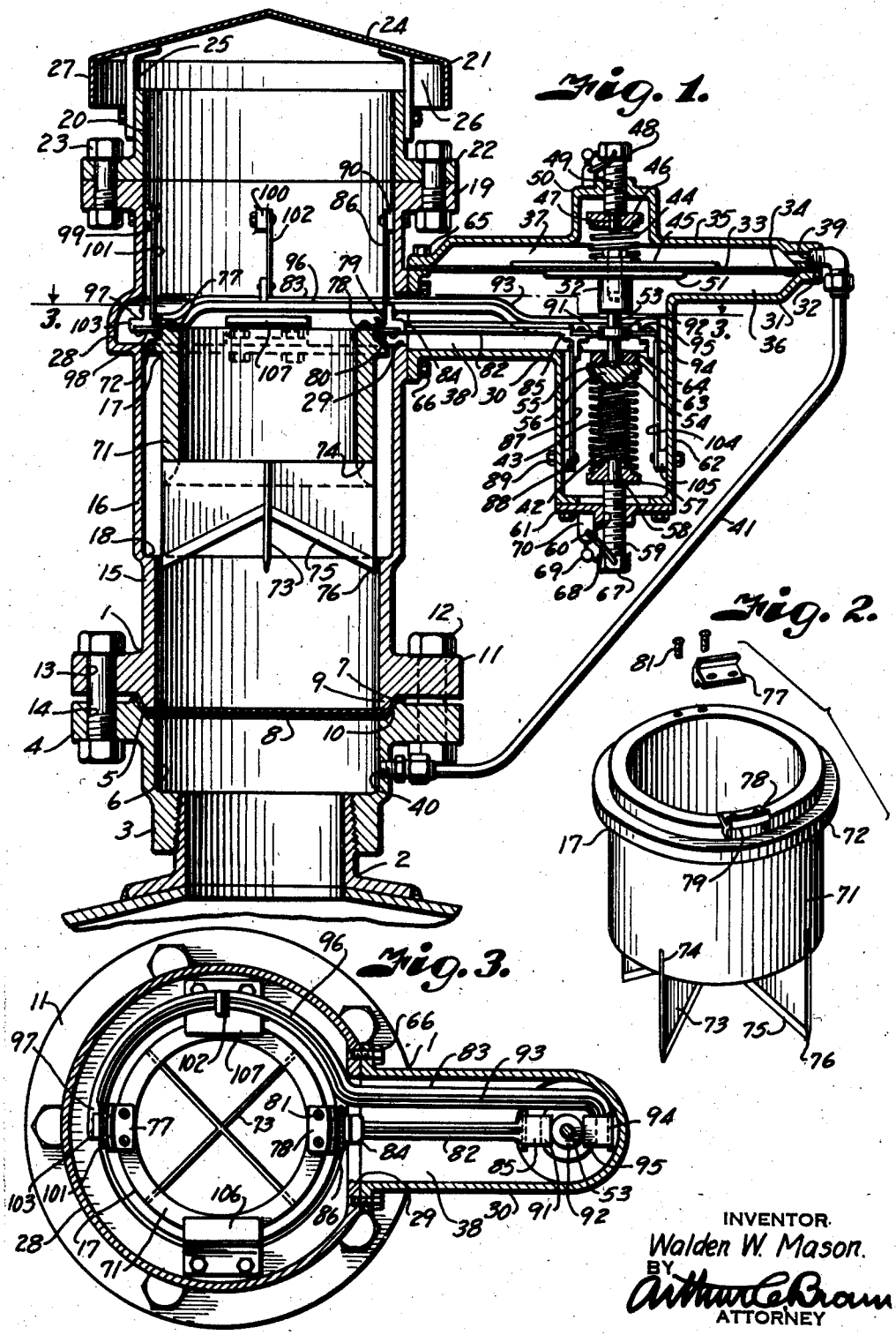
Dec. 8, 1942.  W. W. MASON  2,304,417
SAFETY DEVICE FOR LOW PRESSURE VESSELS
Filed March 6, 1940  3 Sheets-Sheet 1
INVENTOR.
Walden W. Mason.
BY Arthur C. Brown
ATTORNEY

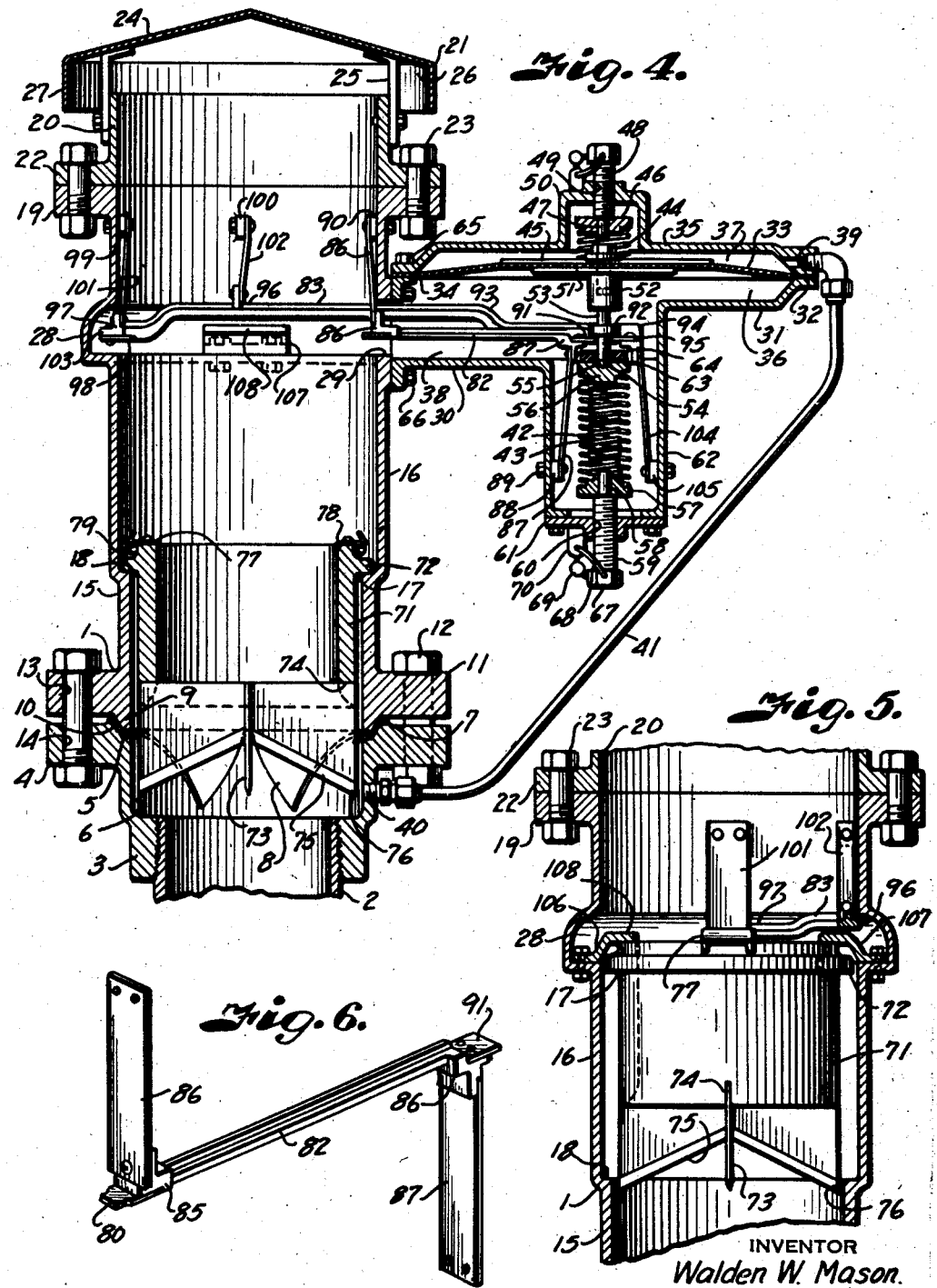
Dec. 8, 1942. W. W. MASON 2,304,417
SAFETY DEVICE FOR LOW PRESSURE VESSELS
Filed March 6, 1940 3 Sheets-Sheet 2
INVENTOR
Walden W. Mason.
BY
ATTORNEY Dec. 8, 1942.  W. W. MASON  2,304,417
SAFETY DEVICE FOR LOW PRESSURE VESSELS
Filed March 6, 1940  3 Sheets-Sheet 3
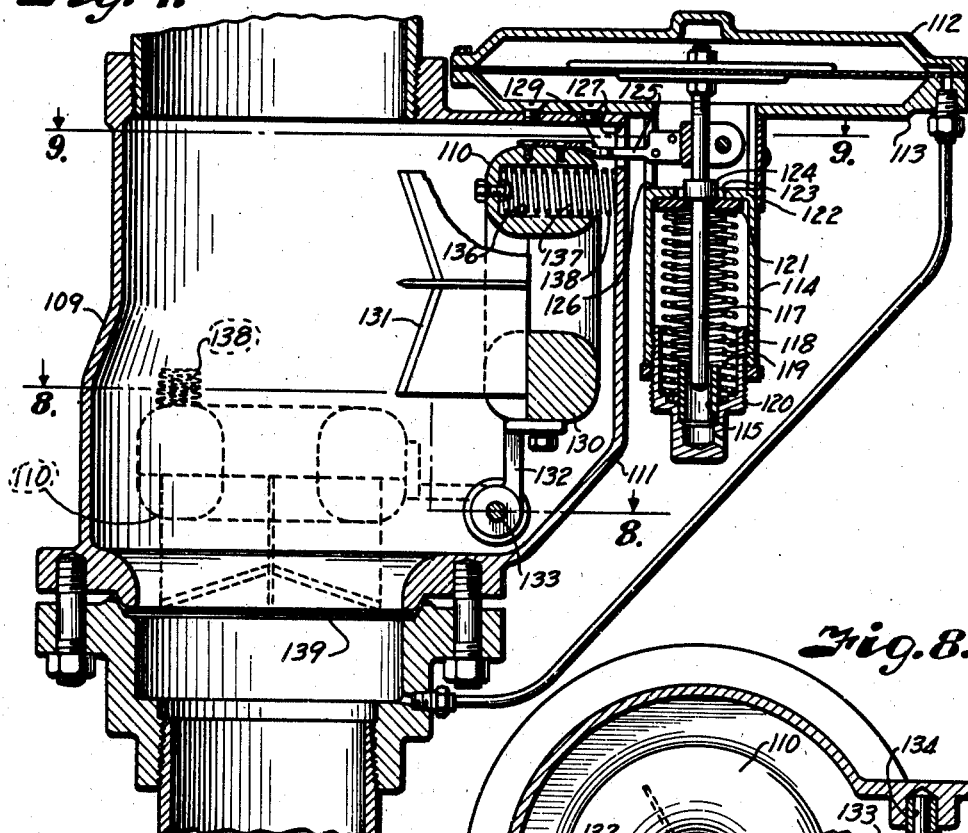
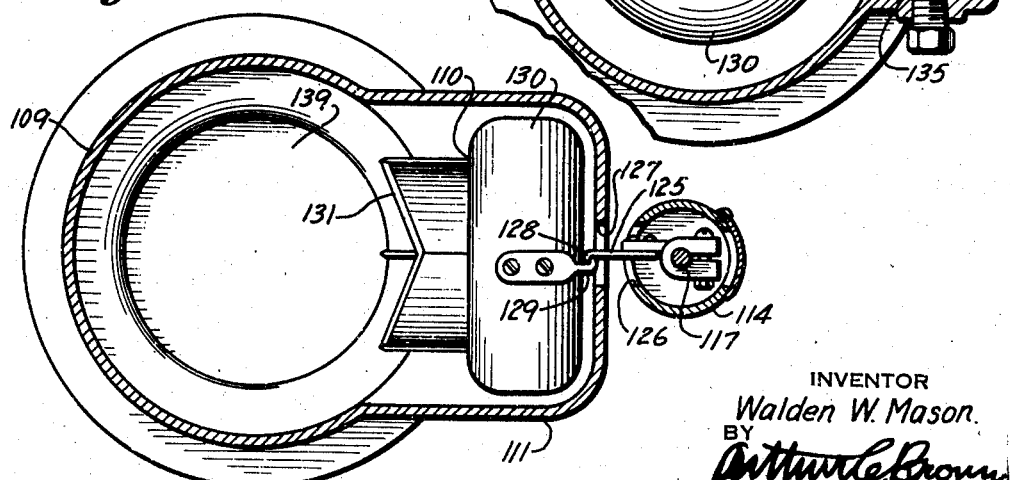
INVENTOR
Walden W. Mason.
BY
Arthur C. Brown
ATTORNEY Patented Dec. 8, 1942

UNITED STATES PATENT OFFICE 2,304,417

SAFETY DEVICE FOR LOW PRESSURE VESSELS

Walden W. Mason, Kansas City, Mo.

Application March 6, 1940, Serial No. 322,476

15 Claims. (Cl. 220—89)

This invention relates to safety devices for protecting vessels or other equipment containing fluids under normally slight pressures, for example storage tanks for containing volatile hydrocarbon fluids. Tanks of this character are usually constructed for containing only slight pressures and are structurally incapable of withstanding pressures much above or below the normal working pressures, consequently such tanks are equipped with some form of pressure and vacuum relief valves in order to prevent injury of the tank by excess pressures and to avoid collapse thereof when the tanks are emptying. However, most of these valves are inadequate to give proper relief under extreme conditions for the reason that they do not hold the required pressure, or they will not operate to relieve pressure at the low pressure desired.

It is, therefore, the principal object of the present invention to provide a safety mechanism that affords adequate relief of close pressure differentials, usually a few ounces.

Other objects of the invention are to provide a safety device with a relatively large relief opening normally closed by a diaphragm which is readily disrupted responsive to low pressures; to provide for multiplication of the actuating pressure thereby increasing reliability of the device under low working pressures; to provide a diaphragm shearing head normally supported in operative position relative to the diaphragm by a simple and reliable trigger mechanism, readily releasable responsive to low pressures; and to provide a trip mechanism responsive to low pressures acting from within or without the vessel.

In accomplishing these and other objects of the invention, as hereinafter pointed out, I have provided improved details of structure, the preferred forms of which are illustrated in the accompanying drawings, wherein:

Fig. 1 is a vertical section through a safety device constructed in accordance with the present invention and showing the shear head in latched position.

Fig. 2 is a detail perspective view of the shear head showing one of the latch engaging ears detached and in spaced relation.

Fig. 3 is a horizontal section on the line 3—3 of Fig. 1.

Fig. 4 is a vertical section similar to Fig. 1 but showing the diaphragm shearing head in tripped position.

Fig. 5 is a vertical section through a portion of the device taken at right angles to the section shown in Fig. 1.

Fig. 6 is a detail perspective view of one of the trip levers and its resilient supports.

Fig. 7 is a vertical section through a modified form of the invention showing the shear head in latched position in full lines and in tripped position in dotted lines.

Fig. 8 is a horizontal section on the line 8—8 of Fig. 7.

Fig. 9 is a similar horizontal section on the line 9—9 of Fig. 7.

Referring more in detail to the drawings, and first to the form of the invention shown in Figs. 1 to 6 inclusive:

1 designates a safety device which is adapted for connection with a vessel or the like containing fluid under slight pressure and for effecting release of a predetermined high pressure within the tank or a predetermined negative pressure, the device 1 being connected with the tank by a nipple 2 having sufficient capacity to give the desired relief when dangerous pressures are reached within the vessel so as to avoid disruption thereof.

The device 1 preferably includes a collar 3 secured to the nipple 2 and having a lateral flange 4 and provided with an inclined annular gripping face 5 encircling an opening 6 in the collar which communicates through the nipple 2 with the interior of the tank. Seated on the face 5 is the peripheral marginal edge 7 of a diaphragm 8 arranged to normally close flow from the nipple through the opening 6. The marginal edge 7 of the diaphragm 8 is retained in grippinig engagement with the face 5 by an annular rib 9 having a gripping face 10 engaging the opposite face of the diaphragm margin 7, the rib 9 being formed as a part of an annular flange 11 corresponding to the flange 4.

The flanges 11 and 4 are secured together to effect gripping contact with the diaphragm by suitable fastening devices, such as bolts 12, extending through registering openings 13 and 14 in the respective flanges as clearly shown in Fig. 1. The inner diameter of the flange 11 corresponds to the diameter of the opening 6 and connected therewith is a housing 15, having an enlarged upper portion 16 for normally containing a shear head 17, later described, and which cooperates with the lower portion of the sleeve to form a ledge 18. The enlarged upper portion 16 of the sleeve terminates in a lateral flange 19 for seating the collar 20 of a weather-cap 21. The collar 20 conforms to the inner diameter of the upper portion of the housing and has a flange 22 secured to the flange 19 by fastening devices such as bolts 23.

The cap 21 includes a substantially conical-shaped cover 24 that is supported above the open end of the collar 20 by brackets 25 to form an outlet 26 therebetween which is protected by a depending eave 27 of the cap as clearly shown in Fig. 1. Formed in the enlarged portion of the housing 15 is an annular offset 28 terminating in one side of the housing in an opening 29. Secured over the opening is an actuator diaphragm housing 30 including a section 31 having a diaphragm seat 32 for supporting the marginal edge of a relatively large flexible diaphragm 33. The diaphragm 33 is clamped to its seat by means of an annular flange 34 on a complementary housing section 35. The sections 30 and 35 of the diaphragm housing are shaped to provide pressure chambers 36 and 37 on the respective sides of the flexible diaphragm 33, and one of the chambers, for example 36, is connected with atmosphere preferably through the housing 15 by means of a lateral duct 38 registering with the opening 29, while the other chamber is provided with an opening 39 having connection with an opening 40 in the collar 3 by means of a pipe 41 so that the pressure acting on the lower side of the safety diaphragm is admitted to the relatively large diaphragm 33 to cooperate with the atmospheric pressure in the chamber 36 in flexing the diaphragm 33 when excess pressure differentials occur in the respective chambers as set by diaphragm loading springs 42, 43 and 44. The spring 44 is seated on a plate 45 engaging the top of the actuating diaphragm and its opposite end engages a disk 46 carried on the reduced end 47 of an adjusting screw 48, the screw 48 being threaded in an opening 49 in a dome-like extension 50 of the upper diaphragm housing section.

Connected with the plate 45 and bearing against the lower side of the actuator diaphragm 33 is a plate 51 having a boss 52 carrying a depending stem 53 terminating in a coned end 54 which seats in a recess 55 of a disk 56 seating the upper ends of the sleeved springs 42 and 43. The lower ends of the springs are carried by a similar disk 57 supported on the reduced end 58 of an adjusting screw 59. The adjusting screw 59 is threaded into an opening 60 formed in a plate 61 which closes the open end of a cylinder-like extension 62 on the lower housing section and which provides an enclosure for the springs 42 and 43.

The spring seating disk 56 preferably carries a buffer washer 63 having an opening 64 therein to pass the stem 53. By adjusting the springs on the respective sides of the diaphragm through manipulation of the adjusting screws, the diaphragm may be normally balanced between the differential pressures in the respective chambers 36 and 37. The diaphragm sections are retained in clamping contact with the diaphragm by fastening devices such as screws 65 extending through the flanges thereof and the lower diaphragm section is secured to the housing 15 by fastening devices 66.

In order to prevent unauthorized tampering with the adjusting screws, the heads 67 thereof may be apertured to pass the strand 68 of a seal 69, the strand also passing through lugs 70 as shown in Fig. 1.

Slidable in the upper, enlarged portion of the housing above the ledge 18 is the shear head 17 which includes a ring-like body or weight 71 of suitable outer diameter to slide within the lower portion 15 of the housing, and which has a peripheral flange 72 at its upper end to engage the ledge 18 and support the shear head when the shear head has been dropped upon the diaphragm 8. The shear head includes radially arranged blades 73 fixed within slots 74 formed in the lower portion of the ring 71. The blades have knife edges 75 which preferably diverge outwardly and downwardly to form points 76 at the outer ends thereof to piercingly engage the diaphragm near its points of support, and to begin shearing cuts across the diaphragm.

Fixed at opposite diametrical sides on the upper end of the ring 71 are ears 77 and 78 having flange portions 79 projecting outwardly in spaced relation with the annular flange 72 for the engagement by latch plates 80 therebetween. The ears just described are secured in position by fastening devices such as screws 81. The latch plates are carried on the ends of supporting bars 82 and 83. The bar 82 includes a bar-like arm located in the duct 38 and which has spring-attaching brackets 84 and 85 on the respective ends thereof to attach flat springs 86 and 87. The spring 87 projects downwardly within the spring housing 62 and connects with an inwardly extending boss 88 by fastening devices 89. The other spring 86 extends upwardly within the upper portion of the housing 15 and is secured to inwardly extending lugs 90 on the side wall thereof as shown in Fig. 4. The springs are normally tensioned so that the lever arm is shifted toward the right to retain a contact plate 91 on the bar 82 normally in contact with a disk-like collar 92 on the stem 53, previously described, and retain the latch plate 80 at the opposite end of the lever arm engaged under the ear 78.

The other bar 83 includes a portion 93 extending alongside the bar 82 and terminates in a lateral arm 94 carrying a contact plate 95 similar to the contact plate 91 and which engages the opposite diametrical side of the collar 92. The bar at the opposite end of the shank includes an arcuate portion 96 freely supported in the annular offset 28 of the housing 15 and which has its free end 97 carrying a latch plate 98 engageable under the other ear 77. The bar 83 is suspended from lugs 99 and 100 by flat springs 101 and 102, the spring 102 being attached to a lug 103 on the arcuate portion of the arm and the spring 101 being attached to the bracket carrying the latch plate 98. The lateral arm 94 which carries the contact plate 95 also has a bracket carrying a flat spring 104 which has its opposite end secured to a lug 105 projecting inwardly of the spring housing similarly to the attachment of the spring 87 previously described. The springs 101, 102 and 104 are so tensioned that they shift the bar 83 to the left and retain the contact plate 95 in engagement with the collar 92 when the latch plate 98 is engaging under the ear 77 to suspendingly support the shear head above the diaphragm.

With the safety diaphragm in position and the actuator diaphragm adjusted so that the collar 92 is retained in engagement with the edges of the contact plates, at predetermined differential pressure on the respective sides of the actuator diaphragm 33, the shear head is retained in suspension over the safety diaphragm 8. However, should a pressure occur in the vessel below the predetermined minimum, the pressure on the atmospheric side of the actuating diaphragm preponderates with the result that the springs are thrown out of balance and the collar 92 is shifted so that the contact plates pass thereunder and engage the shank 63 responsive to action of the leaf springs, consequently the latch plates are spread apart and release the shear head. The shear head then drops into shearing contact with the diaphragm 8 so that atmospheric pressure may rush into the tank and prevent collapse of the tank. Reversely, should excess pressures occur in the tank, the diaphragm is moved in the opposite direction so that the contact plates move off of the top edge of the collar 92 to similarly release the shear head and effect shear of the diaphragm so that the excessive pressures are released from the vessel.

When the shear head is actuated to effect release of vacuum in the tank, downward movement of the shear head is stopped by the flange 72 thereof engaging the ledge 18. When excessive pressure is released there may be a tendency for the shear head to blow outwardly, and to limit the movement thereof the offset portion of the housing is provided with clips 106 and 107 having arm portions 108 extending over the upper edge of the shear head ring as shown in Fig. 5.

After the safety diaphragm has been disrupted, it is necessary to replace it with a new safety diaphragm and to relatch the shear head so that the ears thereon engage the latch plates of the spring supported bars. When normal pressures occur within the vessel as set by the springs on the respective sides of the diaphragm, the collar 92 is in position to retain the lever arms with the latch plates in engagement with the under sides of the ears. Shifting of the bars loads the supporting springs thereof so that they are effective in shifting the bars in the opposite direction whenever the collar 92 has moved out of registry with the contact plates.

In the form of the invention shown in Figs. 7 to 9 inclusive, the housing 109 for the shear head 110 has a lateral extension 111 on the actuating diaphragm side thereof and the diaphragm housing 112 is secured thereto as shown in Fig. 7. The lower section 113 of the diaphragm housing has a depending spring housing 114 carrying a guide 115 for the diaphragm stem 117. In this form of the invention, the lower ends of the springs 118 and 119 are carried in a cup-like plug 120 adjustably carried by the spring housing to vary compression of the springs. The opposite end of the springs seats against a washer 121 bearing against the partition 122 of the spring housing, the partition having an opening 123 to pass a collar 124 on the diaphragm stem 117 so that the collar seats against the spring seating washer. Fixed on the diaphragm stem above the collar 121 is an arm 125 extending through registering slots 126 and 127 in the spring housing and lateral extension 111 respectively to terminate in a hook 128 adapted to engage a similar hook 129 carried by a ring-like weight 130 which carries the shear blades 131. The weight 130 is pivotally carried by an arm 132 on a shaft 133 having its end journalled within bearings 134 and 135 in the sides of the housing extension as shown in Fig. 8. The weight is provided with a recess 136 on the side thereof opposite the knives to contain a coil spring 137 having a projecting end 138 engaging against the wall of the lateral extension 111 when the hooks are interengaged as shown in Fig. 9. When the diaphragm is actuated to effect movement of the hook 128 relative to the hook 129, the hook 129 is released and the spring acts to throw the shear head 110 into shearing contact with the safety diaphragm 139. This spring also serves as a shock absorber when excessive pressures blow the shear head backwardly into the lateral extension of the housing after the diaphragm has been disrupted.

From the foregoing it is obvious that I have provided a safety device which is well adapted for operation at relatively low pressures. It is also obvious that the shear head of the diaphragm is retained by a reliable trip mechanism which is readily released by low pressure due to the large size of the actuator diaphragm.

What I claim and desire to secure by Letters Patent is:

1. A safety device of the character described including a rupturable diaphragm for retaining a pressure medium, means supporting the diaphragm, diaphragm shearing means having cutting edges extending substantially radially with respect to the diaphragm, latch mechanism carried by the supporting means for suspending the shearing means over the diaphragm, a trip actuator, means for conducting the pressure medium to the trip actuator, and trip means connected with the trip actuator and the latch mechanism for effecting release of the shearing means to effect cuts through the diaphragm by said cutting edges.

2. A safety device of the character described including a diaphragm, supporting means for the diaphragm, a housing carried by the supporting means, a shear head in the housing and adapted to move into shearing contact with the diaphragm, said head having blades arranged substantially radially with respect to the diaphragm, and means in the housing and subject to differential pressures acting on the diaphragm for effecting movement of the shear head to bring said blades into shearing contact with the diaphragm.

3. A safety device of the character described including a diaphragm subject to a pressure medium, supporting means for the diaphragm, a housing carried by the supporting means, a shear head in the housing and adapted to move in shearing contact with the diaphragm, latch means in the housing for supporting the shear head in spaced relation with the diaphragm, pressure actuated means, trip means connecting the pressure actuated means with said latch means, and means for admitting said pressure medium to said pressure actuated means for effecting actuation of the trip means to release the latch means.

4. A safety device of the character described including a safety head, supporting means for the safety head, a housing carried by the supporting means, a shear head in the housing and adapted to move in shearing contact with the safety head, latch means in the housing having latch engagement with the shear head for supporting the shear head in spaced relation with the safety head, pressure actuated means supported by the housing, trip means connecting the pressure actuated means with said latch means, and means for admitting a pressure medium acting upon the safety head to said pressure actuated means for effecting actuation of the trip means and release of the latch means.

5. An apparatus of the character described including a housing, a diaphragm in the housing, a shear head, means releasably supporting the shear head over the diaphragm, trip means connected with the shear head supporting means for releasing the shear head, and trip release means connected with said trip means, including a pressure actuated diaphragm having opposite sides subject to pressures corresponding with pressures acting upon the first named diaphragm.

6. An apparatus of the character described including a housing, a diaphragm in the housing subject to a pressure medium, a shear head, shear head supporting means having releasable connection with the shear head, trip means having movable support in the housing and arranged to shift the shear head supporting means for releasing said connection, a pressure actuated diaphragm connected with the trip means, and means for admitting said pressure medium to act on the pressure actuated diaphragm for effecting actuation of the trip means to release the shear head.

7. A device of the character described including a housing, a diaphragm supported in the housing, a shear head in the housing, a pair of bars supported in the housing and having latch members suspendingly supporting the shear head over the diaphragm, the supporting means for the bars tending to urge the latch members into unlatched position, contact members carried by the respective bars, means spacing the contact members and retaining the latch members in engagement with the shear head, and an actuator connected with the spacing means to shift said spacing means from between said contact members to effect shift of the bars and effect release of the latch members from the shear head.

8. In combination with a vessel for containing liquids under slight pressure including a safety device having a flow passage connected with the tank, a diaphragm normally closing the flow passage, a shear head, latch means spacingly supporting the shear head over the diaphragm, pressure actuated means, trip means connecting the pressure actuated means with said latch means, and means for admitting pressure in said tank to the pressure actuated means whereby the pressure actuated means is operated to effect actuation of the trip means and release of the shear head and effect disruption of the diaphragm.

9. A device of the character described including a housing, a diaphragm supported in the housing, a shear head in the housing, a pair of bars supported transversely of the housing and having latch members suspendingly supporting the shear head over the diaphragm, the supporting means for the bars tending to urge the latch members into unlatched position, contact members carried by the respective bars, means spacing the contact members and retaining the latch members in engagement with the shear head, a flexible diaphragm, a housing enclosing said flexible diaphragm and forming chambers on the respective sides thereof, a stem connecting the flexible diaphragm with said spacing means, means for admitting atmospheric pressure to one of the chambers, means for admitting a pressure medium to the other of said chambers, and means for balancing the flexible diaphragm against said pressures to normally retain the spacing means in engagement with the contact members and to allow movement of the flexible diaphragm upon change of pressure in one of said chambers to effect movement of the supporting bars for release of the shear head.

10. In combination with a vessel for containing liquids under slight pressure including a safety device having a flow passage connected with the vessel, a diaphragm normally closing the flow passage, shear means, means supporting the shear means over the diaphragm, pressure actuated means, means connected with the pressure actuated means to maintain said connection with said supporting means in one position of the pressure actuated means, and duct means connecting the pressure actuated means with the vessel for admitting pressure from said vessel to the pressure actuated means whereby the pressure actuated means is operated to effect release of the shear means.

11. In combination with a vessel for containing liquids under slight pressure, a safety device including a housing having a flow passage connected with the vessel, a diaphragm normally closing the flow passage, a weighted shear head supported over the diaphragm said supporting means having releasable engagement with the shear head, and means responsive to pressure in said vessel for releasing shear head from the supporting means.

12. In combination with a vessel for containing liquids under slight pressure, a safety device including a housing having a flow opening, a diaphragm normally closing said opening, means for effecting shear of the diaphragm, means supporting the shear means in position for the shear means to drop into shearing contact with the diaphragm, and means for releasing the shear means from said supported position, said means being responsive to differential pressure between the interior and exterior pressures acting on the vessel for effecting actuation of the shear means upon a predetermined change in said differential pressure, said means including means independent of said pressure differential for effecting positive action of said shear means.

13. A safety device of the character described including, a housing having an inlet for a pressure medium, a rupturable diaphragm supported in the housing to close said inlet for normally retaining the pressure medium, diaphragm shearing means, latch mechanism carried in the housing and having releasable connection with the diaphragm shearing means to releasably support the shearing means relative to the diaphragm, trip means connected with the latch mechanism for effecting release of the shearing means to disrupt the diaphragm, a pressure responsive actuator having operating connection with the trip means, a duct connecting said inlet with the pressure responsive actuator through which pressure medium is conducted to act upon the pressure responsive actuator, and balancing means acting upon the pressure responsive actuator in opposition to said pressure medium, said balancing means being arranged to oppose said pressure medium at a predetermined pressure and being expandable when the pressure drops below said minimum to effect release of said shearing means.

14. A safety device of the character described including, a housing having an inlet for a pressure medium, a rupturable diaphragm supported in the housing to close said inlet for normally retaining the pressure medium, diaphragm shearing means, latch mechanism carried in the housing and having releasable connection with the diaphragm shearing means to releasably support the shearing means relative to the diaphragm, trip means connected with the latch mechanism for effecting release of the shearing means to disrupt the diaphragm, a pressure responsive actuator having operating connection with the trip means, a duct connecting said inlet with the pressure responsive actuator through which pressure medium is conducted to act upon the pressure responsive actuator, and balancing means acting upon the pressure responsive actuator in opposition to said pressure medium, said balancing means being arranged to oppose said pressure medium at a predetermined pressure and being yieldable when the pressure increases above said predetermined pressure to effect release of said shearing means.

15. A safety device of the character described including, a housing having an inlet for pressure medium, a rupturable diaphragm supported in the housing to close said inlet for normally retaining pressure medium, a diaphragm shearing head, a pair of shift members, spring means normally suspending said members in the housing, latch means carried by said members having latch engagement with the shearing head to support the shearing head above the rupturable diaphragm, a diaphragm housing supported by the first named housing, a diaphragm in the diaphragm housing, a trip normally engaged between said shift members to retain latched engagement of the shearing head, means connecting the trip with the last named diaphragm to move the trip in one direction, an expansion spring connected with the trip to move the trip in the opposite direction, and means for maintaining pressure acting on the respective sides of the last named diaphragm corresponding to the pressure differentials acting on the rupturable diaphragm.

WALDEN W. MASON.